Nov. 20, 1945. G. E. GUELLICH ET AL 2,389,503
OPTICAL DEVICE
Filed Feb. 11, 1943 2 Sheets-Sheet 1
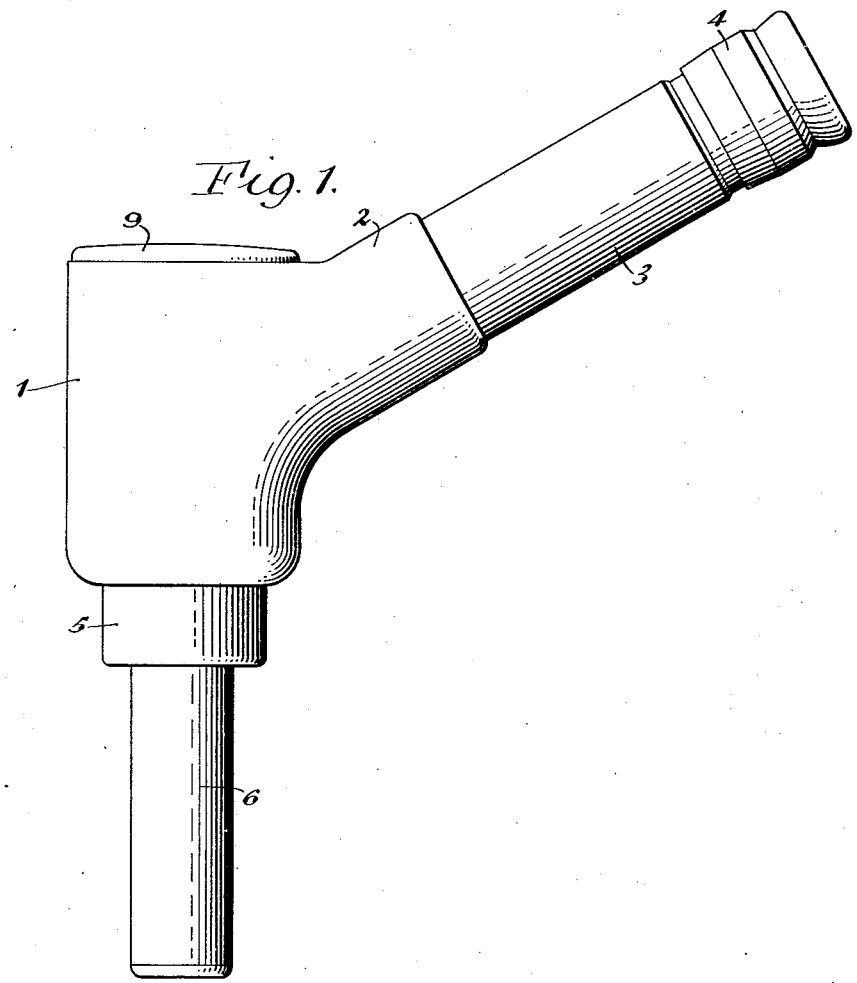
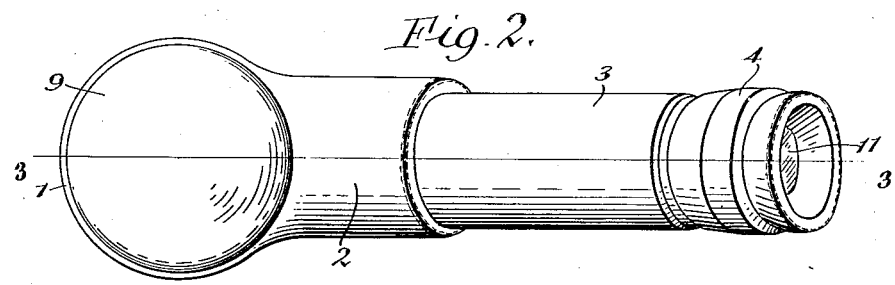
INVENTOR.
GUSTAV E. GUELLICH
ALBIN A. GRADISAR
BY
Raymond A. Paquin
ATTORNEY Nov. 20, 1945.      G. E. GUELLICH ET AL      2,389,503
OPTICAL DEVICE
Filed Feb. 11, 1943      2 Sheets-Sheet 2
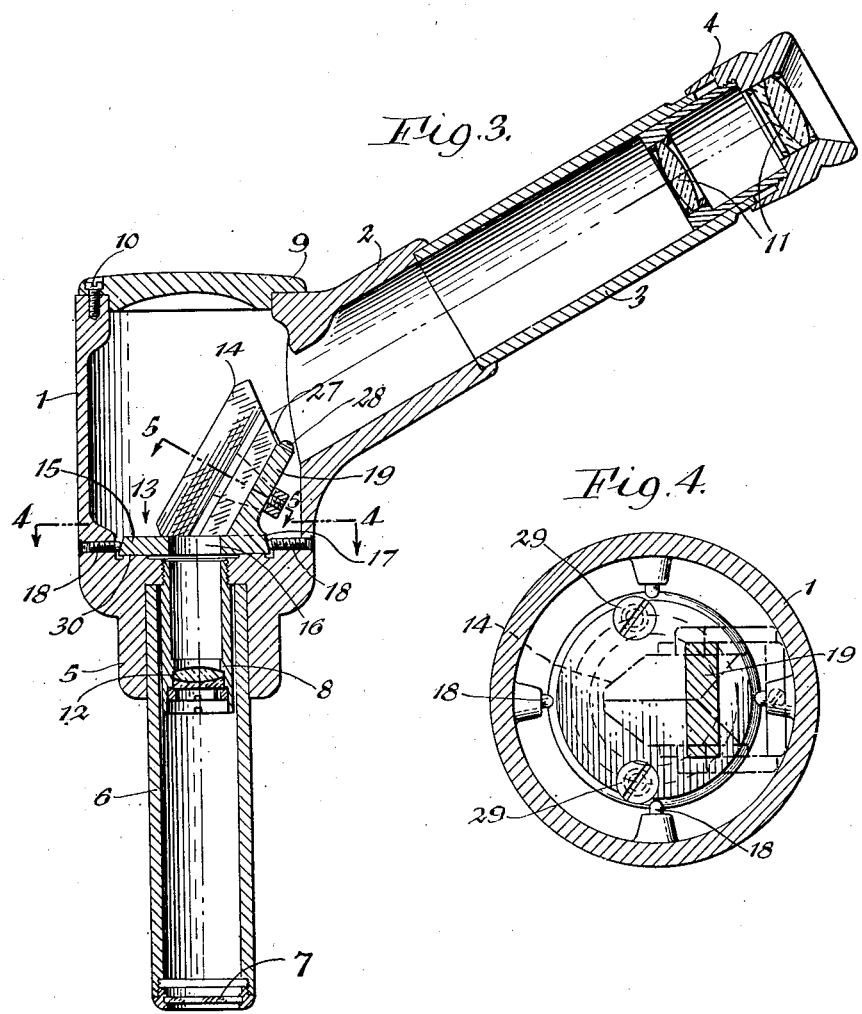
INVENTOR.
GUSTAV E. GUELLICH
ALBIN A. GRADISAR
BY
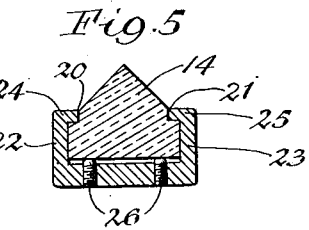
ATTORNEY Patented Nov. 20, 1945

2,389,503

UNITED STATES PATENT OFFICE 2,389,503

OPTICAL DEVICE

Gustav E. Guellich and Albin A. Gradisar, Buffalo, N. Y., assignors, by mesne assignments, to American Optical Company, Southbridge, Mass., a voluntary association Application February 11, 1943, Serial No. 475,554

4 Claims. (Cl. 88—39)

This invention relates to optical devices and has particular reference to a new and improved means for adjustably positioning optical elements in the optical system of such devices.

An object of the present invention is to provide a new and improved means for positioning optical elements in aligned position in the optical system of an optical device.

Another object of the invention is to provide an arrangement which allows the mounting of the optical element on its support prior to positioning the same in the optical system and which also allows adjustment for aligning of said optical element after the mounted element is positioned in the system.

Another object of the invention is to provide an optical device having a new and improved arrangement for positioning an optical element in optically aligned relation with the other elements of the optical system.

Other objects and advantages of the invention will be apparent from the following description taken in connection with the accompanying drawings. It will be apparent that many changes may be made in the details of construction and arrangement of parts without departing from the spirit of the invention as expressed in the accompanying claims. We, therefore, do not wish to be limited to the exact details of construction and arrangement of parts shown and described as the preferred form has been shown by way of illustration only.

Referring to the drawings:

Fig. 1 is a side view of a device embodying the invention;

Fig. 2 is a top or plan view thereof;

Fig. 3 is a sectional view taken on line 3—3 of Fig. 2;

Fig. 4 is a sectional view taken on line 4—4 of Fig. 3, looking in the direction of the arrows; and Fig. 5 is a sectional view taken on line 5—5 of Fig. 3, looking in the direction of the arrows.

In the positioning of optical elements in optical devices or instruments such as microscopes, telescopes and the like it is desirable that the prismatic elements be mounted on their support prior to being positioned in the instrument and that such devices contain some arrangement whereby said elements may be adjusted after being positioned in the instrument in order to optically align the optical element with the other elements of the optical system.

It is therefore the principal object of this invention to provide a new and improved means for supporting an optical element such as a prism or the like in an optical system which allows said optical element to be mounted prior to being positioned in the instrument and which is capable of adjustment after being positioned in the instrument in order to optically align the optical element with the other elements of the optical system and to provide an optical device containing such arrangement.

For the purpose of ilustration the present invention has been shown applied to a microscope although it will be apparent that said invention may be applied to other forms of optical devices such as telescopes or the like.

Referring more particularly to the drawings wherein similar reference characters designate corresponding parts throughout the several views the device shown embodying the invention comprises a body portion 1 having the offset portion 2 to which is connected the viewing tube 3 and eyepiece 4.

The body portion also has the reduced extension 5 to which is secured the tubular member 6 having the window 7 adjacent the lower end thereof and adapted to contain the objective tube 8.

On the upper surface of said body portion 1 is the cap or cover member 9 which is adapted to be retained in position by the screws 10.

In the eyepiece 4 are positioned the eyepiece lenses 11 and in the objective tube 8 is positioned the objective lens system 12.

In the body portion 1 is positioned the support member 13 adapted to support the prism 14 in optically aligned relation with the eyepiece lenses 11 and objective lens system 12 to allow viewing objects beneath the window 7.

This support member 13 comprises an annular plate 15 having the center aperture 16 and has the beveled periphery 17 as shown in Fig. 3 which beveled periphery is adapted to be engaged by the ends of the screws 18 which project through the sides of the body portion 1. A plurality of such screws 18 are provided in spaced relation in the body portion and are so adapted to contact the beveled periphery 17 of the plate 15 that by loosening certain of said screws 18 and tightening other of said screws that said plate 15 may be adjusted to desired relation within the body portion 1 to align the optical elements supported thereby as hereinafter described.

On the annular plate member 15 and between the central opening 16 and the periphery 17 is positioned the offset support member or bracket 19. This support member 19 is preferably formed integral with the plate member 15 although it may be formed separately and secured to said plate member 15 by screws or other suitable means.

This support member 19 is of such form as to support the optical element 14 in desired relation with the tubular member 2 and eyepiece 4 and objective tube 8 and may be of other form than that shown depending upon the form or contour of the particular optical element to be supported.

The form of optical element shown in the drawings is a roof prism which has the shoulders 20 and 21. To retain said prism 14 on the support there is provided the U-shaped clip member adapted to extend across under the outer surface of said support 19 and having the arms 22 and 23 each being provided with a clamp portion 24 and 25 respectively adjacent its extremity which clamp portions are adapted to fit into the groove or slots in the prism and when the screws 26 are tightened against the under surface of the support 19 will firmly retain said prism 14 in position with one end face overlying the opening 16 in the annular plate 15 and with its other end face in aligned relation with the opening in the tube member 2 and the eyepiece lenses 11. To retain said prism 14 in said position there is provided the clip or clamp member 27 which is adapted to engage the face of the prism which is aligned with the opening in the tubular member 2 and which clip member 27 is retained in position on said support 19 by means of the screw or the like 28.

To retain the annular plate 15 in said body portion 1 and against the lower surface thereof there is provided the screw members 29 which may be of any desired number and which extend through openings in said annular plate member 15, which openings are somewhat larger than the diameter of the portion of the screw members 29 extending therethrough so that said screw members 29 may be placed in position to hold the plate member 15 in position during the optical alignment of the prismatic member 14 and then said screw member 29 may be tightened to retain said plate member 15 and prismatic member 14 in said adjusted position.

Surrounding the lower portion of said body 1 is provided a groove or slot through which said screws 18 extend. This groove or slot is provided to allow the filling thereof with wax after said screws 18 have been adjusted to locate said plate 15 in adjusted position. It will be understood that instead of such beveled slot or groove that said screws may merely be positioned in countersunk recesses and said wax placed in said recesses over the screws after they have been adjusted to adjust the plate 15 to desired position.

In employing the present device the prismatic member 14 is positioned with one end face on the annular member 15 and overlying the central aperture 16 therein and retained against the support member 19 by the clamp arms 22 and 23 by tightening the screws 26 as previously described and the clip member 27 is positioned adjacent the opposite end of said prism 14 and in engagement with a portion of the face thereof and said clip 27 is retained in engagement against said prism face by said screw 28 as also previously described.

The prism assembly is then placed within the body portion 1, the lower surface thereof of which is provided with the raised portion 30 adapted to support said plate 15. The screws 29 are then placed through the openings in the plate 15 as previously described and are tightened sufficiently to retain said plate 15 on said raised portion 30.

The screws 18 are then adjusted against the beveled periphery 17 of the plate 15 to optically align the prismatic alignment 14 with the eyepiece elements 11 and the objective lens system 12 which position can be ascertained by viewing through the eyepiece 4 and adjusting said screws 18 until said prism is in desired optical alignment with the eyepiece and objective and then the screws 29 may be tightened to retain said plate 15 and prism 14 in said adjusted position.

The cap member 9 may then be placed in position on the upper surface of the body portion 1 and locked in said position by the screws or the like 10 after which the instrument is in condition for use.

It will be seen from the above, that with the present arrangement the prism or other optical element may be completely mounted on its support before said optical element and support are placed in the instrument and the present construction allows the adjusting of said support and optical element to optically align said element with the other elements of the optical system. After said support and element are placed in the instrument said support may then be locked in said adjusted position to retain said element in desired optical alignment.

From the foregoing it will be seen that we have provided simple, efficient and economical means for obtaining all of the objects and advantages of the invention.

Having described our invention, we claim:

1. A viewing device comprising in combination a body member with an opening for the objective system of the device and an opening for the ocular system of the device, a tubular member carried by said body member and supporting an objective lens system in alignment with said objective opening, an ocular system mounted on said body member in alignment with said ocular opening with the optical axis of the ocular lens system inclined relative to the optical axis of the objective lens system, a prism carrier having a base with an opening therein and a bracket inclined to the base and a prism for deviating light through the angle of inclination of said ocular system carried by said bracket with the prism optically aligned with the opening in said base, said carrier being mounted in said body member with the opening in its base registering with said objective opening and the inclined bracket so related to the ocular system that the optical axis of the objective system as deviated by said prism is substantially aligned with the optical axis of the ocular system, and adjusting devices for engaging the prism carrier for moving the same normally to the axis of the objective system and bodily toward and from the opening for the ocular system.

2. A viewing device according to claim 1 in which said prism is a roof prism with the roof substantially parallel with said inclined bracket.

3. A viewing device comprising in combination a body member with an opening for the objective system of the device and an opening for the ocular system of the device, an objective system carried by said body member in alignment with said objective opening, an ocular system carried by said body member in alignment with said ocular opening with the optical axis of the ocular lens system inclined relative to the optical axis of the objective lens system, a prism carrier having a base with an opening therein and a bracket inclined to the base and a prism for deviating light through the angle of inclination of said ocular system carried by said bracket with the prism optically aligned with the opening in said base, said body member having a seat formed thereon surrounding said objective opening for slidably supporting said prism carrier with clearance for permitting the carrier to be shifted laterally on its seat and toward and from the opening for said ocular system, said carrier being mounted on said seat with the opening in its base registering with said objective opening and the inclined bracket so related to the ocular system that the optical axis of the objective system as deviated by said prism is substantially aligned with the optical axis of the ocular system, and adjusting means engageable with the prism carrier for shifting the same on its seat normally to the axis of the objective system and bodily toward and from the opening for the ocular system.

4. A microscope comprising a microscope viewing system, a microscope objective carrying tube, a body member with an opening for the viewing system of the microscope and a second opening for the objective tube of the microscope, the optical axis of the viewing system being inclined relative to the optical axis of the objective system, a prism adjustably mounted in said body member in optical alignment with the respective axes of the viewing system and objective tube, said body member having a part surrounding the objective tube and having an inner wall portion spaced from said tube, a protecting tube having an end portion in telescoped relation with the objective tube with the outer surface of said end portion engaging said inner wall portion and having a part extending outwardly of said part of the body member surrounding the objective tube, and a transparent cover member adjacent the exposed end of said protecting tube.

GUSTAV E. GUELLICH.
ALBIN A. GRADISAR.